United States Patent [19]

Montemayor et al.

[11] Patent Number: 5,160,377
[45] Date of Patent: Nov. 3, 1992

[54] APPARATUS FOR PREVENTING STICKING OF STACKED FOOD PRODUCTS

[75] Inventors: Ezequiel d. Montemayor, Garza Garcia, Mexico; Marina T. Ollervides, Northbridge, Calif.; Rita M. Gonzalez, Col. Colinas de San jeronimo Mty., Mexico

[73] Assignee: Gruma S.A. de C.V., Garza Garcia, Mexico

[21] Appl. No.: 735,598

[22] Filed: Jul. 25, 1991

Related U.S. Application Data

[62] Division of Ser. No. 614,660, Nov. 14, 1990, Pat. No. 5,118,515.

[51] Int. Cl.⁵ .................... B05C 1/02; B05C 1/08; B05C 19/00
[52] U.S. Cl. ...................... 118/13; 118/18; 118/248; 118/259; 118/DIG. 15; 99/494
[58] Field of Search .............. 118/13, 18, 24, 248, 118/249, 259, DIG. 15, 236, 258; 99/494

[56] References Cited

U.S. PATENT DOCUMENTS

| | | | |
|---|---|---|---|
| 2,070,600 | 2/1937 | Jenett | 118/249 |
| 3,924,567 | 12/1975 | Koeleman et al. | 118/248 |
| 4,046,931 | 9/1977 | Innes et al. | 118/262 |
| 4,055,688 | 10/1977 | Caratsch | 118/202 |
| 4,078,517 | 3/1978 | Castellano et al. | 118/24 |
| 4,237,816 | 12/1980 | Shimono et al. | 118/249 |
| 4,907,720 | 3/1990 | Henson et al. | 118/308 |

FOREIGN PATENT DOCUMENTS

| | | | |
|---|---|---|---|
| 3601146 | 7/1987 | Fed. Rep. of Germany | 118/248 |
| 55-50280 | 4/1980 | Japan | 118/DIG. 15 |
| 64-59278 | 3/1989 | Japan | 118/DIG. 15 |
| WO/85/03243 | 8/1985 | PCT Int'l Appl. | 118/248 |
| 2084455 | 4/1982 | United Kingdom | 118/259 |
| 2107254 | 4/1983 | United Kingdom | 118/248 |

*Primary Examiner*—W. Gary Jones
*Assistant Examiner*—Todd J. Burns
*Attorney, Agent, or Firm*—Eugene Chovanes

[57] ABSTRACT

A relatively uniform distribution of discrete, separate particles of edible powder such as starch or flour that adhere to the surface layer of the tortilla is used to prevent sticking of tortillas, one to another, when stacked in a package. A resilient foam sponge roller is used to first reservoir, and then compressively apply the particles to the surface of the tortilla.

16 Claims, 6 Drawing Sheets

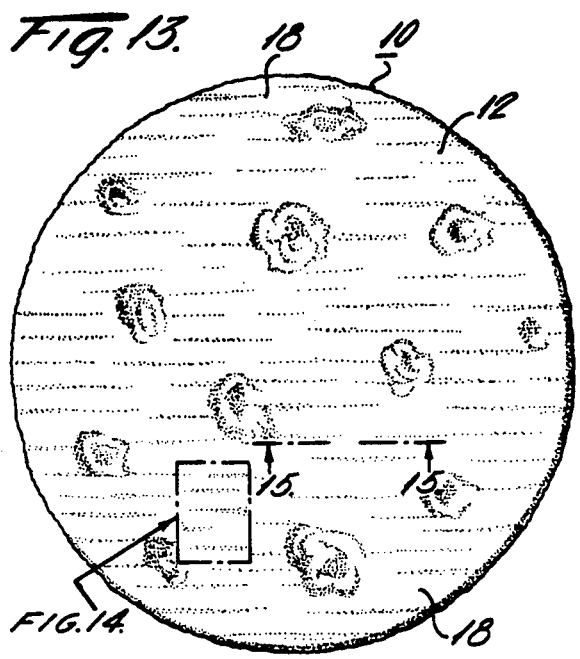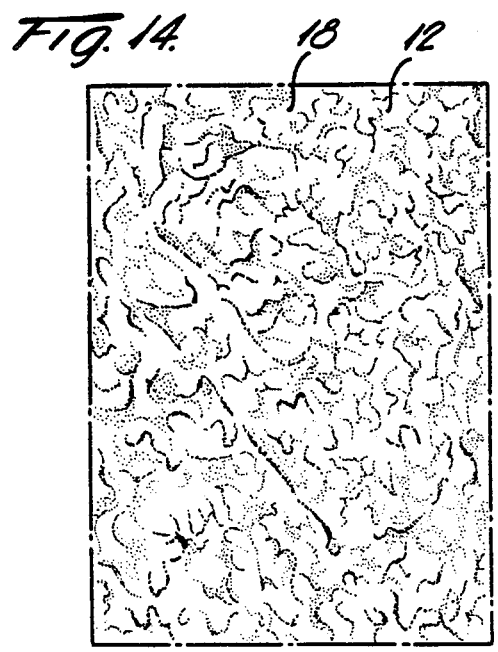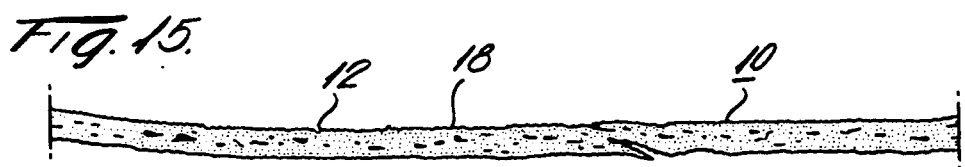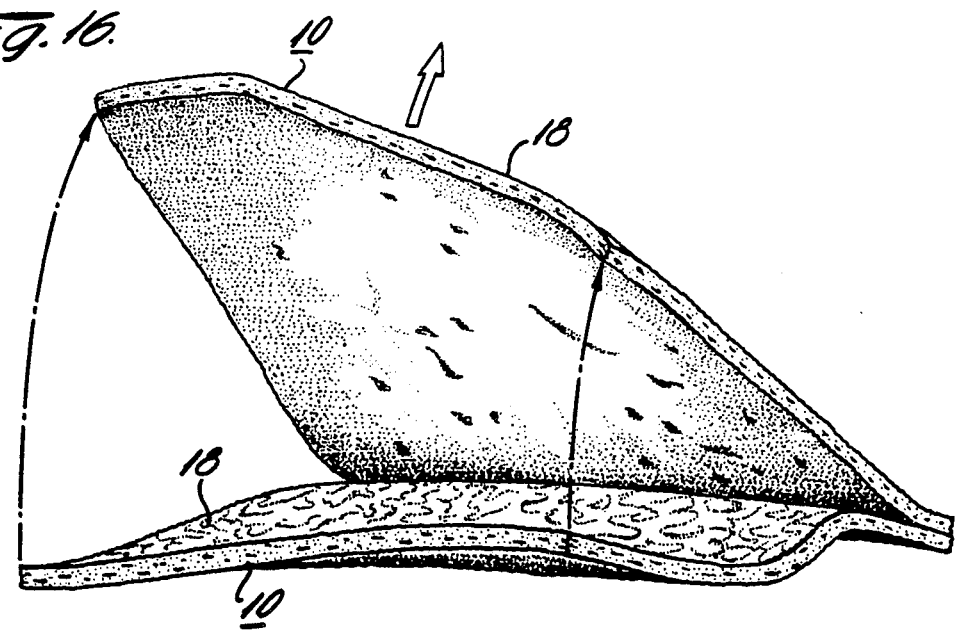

APPARATUS FOR PREVENTING STICKING OF STACKED FOOD PRODUCTS

This application is a division of application Ser. No. 07/614,660, filed Nov. 14, 1990, now U.S. Pat. No. 5,118,515.

BACKGROUND OF THE INVENTION

1. Field of the Invention

The invention relates to tortillas and other baked, unfermented dough products in generally flat form that are stacked within a package.

2. Background Information

1. The Prior Art Product

Although it is believed the invention is applicable generally to unfermented cooked dough products with a textured surface layer in a flat shape, including pitas, pancakes, matzos and the like, the invention was made with tortillas and will be described with respect to such tortillas.

Unlike the usual dough breads with yeast, dough in unfermented cooked dough products, such as a tortilla, does not rise but when the product is baked quickly at high heats, the dough puffs to a varying degree, either from steam formed within the product alone, or from steam and baking powder, an ingredient. The steam condenses into moisture when the tortilla is cooled. This moisture is trapped within the tortilla interior, but eventually the tortilla, if not consumed, will dry out.

Baking time is relatively quick with, for instance tortillas, usually taking from 15 to 40 seconds. The temperature of the tortilla may be 180° F. when it comes out of the baking phase. It may then be rapidly cooled at, for instance, a temperature in the range of 30° F. to 50° F., or at an ambient temperature of, for instance, 78° F.

The tortilla, immediately after baking and cooling, is relatively soft and flexible, and has a textured, contoured, distinct surface layer which has been exposed in the baking process to high heat from, for instance, ribbon gas burners. Contour on the surface layer exists on a very small scale but even to the naked eye, such surface is almost a "moonscape" with creases, ridges, undulations, swirls, depressions, folds, and other contours formed by the non-uniform expansion of the steam during the baking process, as well as from the effect of the high heat.

The tortilla outer distinct surface layer, during baking, is directly exposed to the heat. As opposed, for instance, to a crust on bread, the distinct surface layer is highly flexible and formed into the distinct layer by the relatively rapid baking at high heat and the cooling process. The moisture in the uncooked dough "puffs" during baking and "blows" against the outer surface which has been quickly baked since it is directly exposed to the high heat, causing somewhat of a light "balloon" effect, with the outer surface of the tortilla forming a "skin" of the balloon.

Such tortillas made of corn or wheat flour are well known and extensively made and consumed.

The tortillas, after baking and cooling, are often stacked, one on top of another, and then sealed in a package.

2) The Prior Art Methods

Historically, tortillas were made by the home cook by preparing the dough, forming the tortilla blank in the form of a thin flat disk of about 6" in diameter, by hand or with a stone roller, and baking the tortilla on a flat hot surface such as a stone or metal plate, and then consumed.

Traditionally, the dough was made of a corn flour, but more recently wheat flour tortillas have become popular.

Also, in recent years, tortillas are increasingly being "factory made" on high speed machinery and then packaged in vertical stacks in moisture-proof, sealed packages made of a plastic such as polyethylene.

Typical commercial production rates per installation can range in output from 1200 dozen per hour for 6" tortillas to 600 dozen for 10½" tortillas. The tortillas can be either manually or automatically stacked into, for instance, stacks of one dozen each. A popular size factory-made tortilla is about 10½" in diameter, weighs about 73 grams, and is from about 0.060" to 0.090" thick.

The packages of stacked, fully baked tortillas are subsequently either kept at room temperature, refrigerated, or frozen until consumed. The mode of storage determines the possible permissible time the product can be kept in an edible state.

When intended for use, the package is opened and the tortillas separated and consumed. The tortilla is fully cooked, but is generally warmed or further processed into, for instance, tacos.

The invention is independent of the means and methods of baking, cooking, and stacking the tortillas. It works with all such means and methods, and does not slow down any of such means and methods.

3. The Current Problem

In packaging the tortillas, which can be, as indicated, from for instance 4" to 14" in diameter and from, for instance, 0.030" to 0.200" thick, the tortillas are stacked vertically, one on top of another. A typical stack has 12 tortillas.

The tortillas, which are stacked automatically or by hand, are placed in moisture-proof packages such as polyethylene, and sealed.

When intended to be used, the package is opened and the tortillas separated, one from the other. It has been found that the textured, distinct, outer layer of the tortillas, particularly those of wheat flour dough made by the hot press method, stick and adhere or bond to one another and when separated, cause the distinct surface layer to be peeled from the tortilla, resulting in an unsightly, damaged and defective product. In other instances, the sticking causes the tortilla to break and tear apart.

The present invention overcomes the problem in a simple and effective way, without altering the appearance, texture, taste, flexibility, or other characteristics of the tortilla.

4. Related Prior Art

In the preparation of cooked dough products, sticking has traditionally been a problem, but this problem has been virtually always with the dough prior to cooking. The uncooked dough, as any baker, either home or commercial, can attest, sticks to pans, mixing bowls, utensils and other dough. The solution has been simple; namely, a generous use of loose dusting flour, freely sprinkled in clumps, over the product and then generally rubbed over and into the surface, or in a bulk blanket under the product. Much of the flour remains loose on the surface of the dough and acts as a dry lubricant. The surface is not a distinct layer, but is simply the exposed portion of the mass, and is not affected by relatively rough treatment and cannot in effect be torn. The powder that adheres to the dough is simply baked into the surface of the dough during the baking operation and, as for instance in bread, contributes to a crust.

In the commercial preparation of tortillas, loose dusting flour in bulk blanket or freely sprinkled clump form also was and is often used on the uncooked dough to prevent sticking, particularly in the die-cut method wherein an extruded sheet of dough with much dusting powder in free form thereon is die cut in the fashion of a "cookie cutter", to form the tortilla blank which is then baked. The uncooked dough can be handled roughly, and has no skin or outer layer. The dusting flour can be rubbed over the surface and spread without injury to the dough. The leftover sheet is again extruded, with the dusting powder mixed in. As set forth in U.S. Pat. No. 4,938,126, which describes various commercial methods of preparing tortillas, such use of dusting flour is objectionable since it results in a baked tortilla that has a relatively tough surface layer, whereas it is desirable to have a relatively finer surface layer on the finished tortilla.

In the hand-stretching method of commercially prepared tortillas wherein at a certain stage of preparation, the tortilla dough is stretched by hand, much use of dusting flour in loose, bulk, or clump form is again made on the uncooked dough wherein, again, a relatively rough-textured surface layer results In applying dusting flour to the uncooked dough, generous amounts are freely and loosely sprinkled, in bulk or clump form, over the dough. In many instances, the flour is then rubbed over and into the dough by hand. The dough surface is insensitive to such treatment, so the dough can be handled vigorously without a problem. Where the dough is of a more delicate nature, such as in pie crust, of course more care must be taken in handling the dough.

In the quest for an improved commercially prepared tortilla, use is now being made of a so-called "hot press" method as set forth in the above-mentioned United States Patent. Such method uses heated platens which flatten a dough ball into a thin, flat disk which is baked to form the finished tortilla. The heated platen substantially reduced the problem of dough sticking or adhering to the equipment, so that virtually no dusting flour on the uncooked dough to prevent such sticking is needed. The process results, particularly with the wheat flour tortillas, in a more fine-textured, separate outer layer which is much desired in the finished product. However, wheat flour tortillas produced by the hot press method particularly tend to stick together when stacked in a package.

Prior efforts have been made to reduce the effects of sticking of tortillas, as well as other cooked dough products in flat disk form such as pancakes, pita, and the like, one to another, in a stack contained in a package. An example of such efforts is set forth in U.S. Pat. No. 4,993,788. It was recognized there that the internal moisture within the tortilla appeared to have some relation to sticking. By permitting the tortilla to cool individually at room temperature, on a long travel, after baking and with much cooling air, the stack sticking problem was approached. Such an approach requires much space and much time added to the total process, and is generally unsatisfactory.

Numerous other efforts have been made to prevent such sticking, including trying to form a crust or the like on the tortilla, but these have not proven fully satisfactory.

Additionally, there has been coating tried which includes for instance an oil or the like but, again, this changes the taste and texture of the tortilla, and also the appearance.

Paper separators between the stacked tortillas have been used. This method is expensive, and the packaging time is greatly extended in order to place the paper.

SUMMARY OF THE INVENTION

1. Efforts Leading to the Invention

The present invention is based on the discovery that the sticking problem with fully cooked tortillas in a stack, particularly with fine textured tortillas, appears to a great extent created by the migration of the moisture that is trapped within the cooked tortilla migrating to the surface with time and, instead of evaporating, settling in the surface layer, causing softening and partial deterioration of the layer. The moisture is not free to evaporate from the surface layer because of the adjacent tortilla.

As discussed earlier, tortillas as well as pita and the like have moisture trapped within their interior during the baking process which is relatively rapid and at a relatively high temperature. Such moisture entrapment which during the baking process is steam, of course is essential and inherent in forming tortillas, and results in the puffing or ballooning which contributes to the separate or discrete outer layer.

Sticking apparently occurs in a stack when at least one of the adjacent surface layers of the tortilla unduly softens and physically deteriorates. A fine textured surface layer appears more vulnerable to softening and physical deterioration. The softening and physical deterioration of the surface layer appears to be caused by moisture which migrates from the interior of the tortilla to the surface, where it settles, perhaps on both adjacent surfaces, but at least on one of the adjacent surfaces, since it cannot evaporate into the atmosphere. The soft and physically deteriorated surface layer then meshes and bonds with the adjacent tortilla layer surface.

It further appears, however, that migrating moisture is but one factor in stack sticking. Another factor affecting sticking appears to be the temperature at which the tortilla is packaged and stored, since it appears the higher the temperature, the more rapidly moisture appears to migrate to the surface.

A still further factor affecting sticking appears to be the pressure exerted on stacked tortillas, in that the higher the pressure, the more undesirable bonding takes place.

Another factor affecting sticking appears to be the formulation of the tortilla itself which has a bearing on the after-baking moisture content and the other sticking properties of the tortilla.

Another factor appears to be the uniformity and/or amount of baking. Variations in baking time and temperature create variations in moisture content.

In an effort to control and absorb such moisture and to prevent damage from bonding to the tortillas in a stack, a loose dusting flour was freely sprinkled on the baked tortilla, in much the same manner as was used with the prior art practice on uncooked dough. Such a practice proved totally unacceptable, since the powder left unsightly spots, affected the fine textured skin, and altered the taste of the tortilla- which is in a ready-to-eat state, although it is generally warmed or further processed into tacos or the like. The cooked tortilla carried the taste of the uncooked powder. Additionally, the spots of free flour themselves became clammy.

Efforts were made to spread the clumps of powder on the tortilla surface layer by rubbing the flour over and into the surface as was done with uncooked dough in the prior art. The surface layer tore and it was virtually impossible to smooth out the clumps or spots of powder that settled in the depressions of the contoured surface of the tortilla.

In effect, once the free powder was dusted or dropped onto the tortilla surface, which is contoured, albeit on a fine scale, into ridges, swirls, and the like during the baking process, it was virtually impossible to distribute the powder evenly to cover the entire skin without tearing the skin.

2. The Invention

The present invention comprises, on a tortilla, a relatively uniform distribution of discrete, separate particles of starch or flour that adheres to the surface layer of the tortilla. The particles are compressed onto the tortilla surface with at most little rubbing. Although the powder particles are opaque, they are virtually invisible to the naked eye on the tortilla surface, since they are so fine and relatively uniformly spread apart. There are no clumps or clots of the particles, as exists when loose dusting powder is applied in bulk or by freely sprinkling, so there are no visual spots of powder. The discrete, separated particles of powder on the surface layer prevent a physical deterioration of the surface from migrating moisture, which lends itself to bonding to an adjacent surface. The particles also maintain a slippery, almost lubricating surface on the tortilla skin which also appears to contribute to the prevention of bonding to the adjacent tortilla surface. No freely sprinkled clumps of powder as for instance in dusting dough, are applied to the tortilla. Whereas such freely sprinkled clumps of powder are used with dough to, among other things, lubricate sliding movement between the dough and the supporting surface, the invention uses no such clumps of powder to lubricate or otherwise.

Applicant's invention further involves a method and apparatus for forming and applying such separate, discrete, relatively uniformly distributed particles of powder to the tortilla surface. Sponge foam rolls are used wherein a loose, freely falling line of clumped powder from a hopper-sifter drops onto the rolls which separate and uniformly distribute the powder into particles, reservoir the separate and uniformly distributed particles, and then deposit the discrete, separate and relatively uniformly distributed particles from the reservoir onto the tortilla surface layer by compression.

The separated particles of powder deposited relatively uniformly on the tortilla surface, while preventing any sticking of one tortilla to another in a stack in a package over any period of time, do not disturb the color or texture or taste of the tortilla. The particles are so small as to be virtually invisible to the naked eye. The process can be a continuous one and is extremely efficient and simple. The powder used is totally natural and would not be objectionable to any food regulatory authority because of undesired chemicals.

The powder used in the invention is preferably a commercial grade of fine corn starch, but wheat starches or others including tapioca starch may be used. Also, flours may be used such as wheat flours. An important factor in the powder ingredient used in the invention is that it be fine, dry, relatively inert, edible, and capable of being relatively easily separated into particles before being applied to the tortilla surface layer.

It has been discovered that fine corn starch works particularly well in the invention. The starch, being relatively insoluble in water, does not become damp before being used and thus lends itself to being separated into particles for application to the tortilla. Also, once on the tortilla, the separated starch particles appear to particularly keep the surface dry and slippery.

It is very important in the invention that the powder be separated into particles and then distributed evenly and in the proper quantities. This is achieved by first separating the powder into separate particles between two resilient open-pored foam rolls in rolling compression. The discrete particles are simultaneously loaded from the first roll into the second roll, wherein the discrete, separate particles are reservoired in the fine pores of the foam roll. The loaded foam sponge reservoir is then brought into a rolling compressive contact with the upper surface layer of the tortilla, which is passing beneath the loaded foam sponge reservoir on a conveyor. The relatively uniformly distributed, discrete separate particles of powder are then transferred to the tortilla surface, and are compressed thereon, where they adhere. There is at most little rubbing of the particles on or into the tortilla.

Some of the uniformly distributed, discrete, separated particles may fall from between the rolls onto the tortilla before it passes beneath the deposition roller.

In the invention, the moisture apparently migrates from the interior of the tortilla while in the package, and settles in or around the separate particles of powder, rather than in the tortilla surface. A phenomenom occurs when the package is opened in that the moisture apparently immediately evaporates from the easily separated tortillas and the surface looks, feels and tastes virtually identical to what it was before the tortilla was packaged. The results are equally favorable whether the package is stored at room temperature, refrigerated, or frozen. Of course, the method of storage determines the maximum shelf life of the product, but the benefits of the invention are obtained without regard to the method of storage.

BRIEF DESCRIPTION OF THE DRAWINGS

FIG. 13 is a plan view of the upper treated face of a typical processed tortilla. This view is similar to that of FIG. 9.

FIG. 14 is an enlarged fragmentary plan view of the detail contained within the dot-and-dash rectangle shown in FIG. 13 and designated FIG. 14, showing the texture of the treated surface of the tortilla which remains visually the same as the untreated tortilla. This view is similar to that of FIG. 10.

FIG. 15 is a fragmentary sectional elevational view taken on the line 15,15 of FIG. 13, illustrating the lack of delamination of layers in a slightly dried, treated tortilla. This view is similar to that of FIG. 11.

FIG. 16 is an enlarged fragmentary pictorial view illustrating a clean separation, no sticking, scabbing, scaling, or adhesion when separating a tortilla from a stack of packaged treated tortillas. This view is similar to that of FIG. 12.

DESCRIPTION OF THE PREFERRED EMBODIMENT

Prior Art

Figure 1:
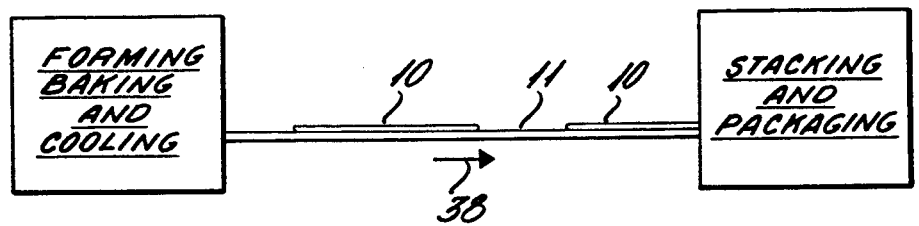
FIG. 1 is a schematic view of the prior art process of making, stacking, and packaging tortillas.

As described above and as seen in FIG. 1 in the prior art, tortillas 10 are formed and baked and then cooled in any number of prior art processes. Usually the tortillas emerge from the baking or cooling zone on a conveyor 11 to pass to the stacking and packaging zone.

Prior art tortillas 10 as best seen in FIGS. 9 through 12 have a distinct surface layer 12, formed during the baking and cooling process. The skin 12 is formed by a baking action on the outside and a steam puffing action on the inside which blows or puffs the surface 12 into a relatively separate layer. Moisture is trapped within the inside 13. The dough in the interior of the tortilla is also cooked and forms the interior 13 of the tortilla.

Figure 9:
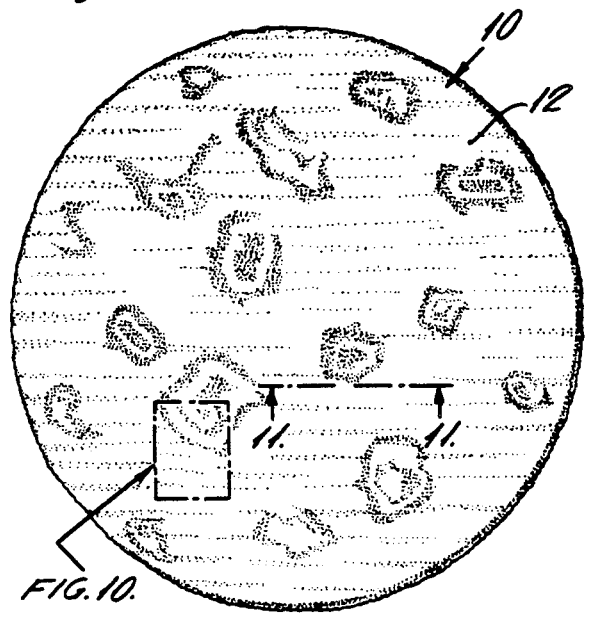
FIG. 9 (prior art) is a plan view of the upper untreated face of a conventionally processed tortilla (approximately 10.25" diameter).
Figure 10:
FIG. 10 (prior art) is an enlarged fragmentary plan view of the detail contained within the dot-and-dash rectangle shown in FIG. 9 and designated FIG. 10, showing the texture of the untreated surface of the tortilla.

The surface layer or skin 12 of the tortilla 10 as seen particularly in the magnified views of FIGS. 9 and 10, has a contoured surface with ridges, streaks, crevices and the like. Although such surface appears smooth to the naked eye, it is, as can be seen, relatively rough.

Figure 3:
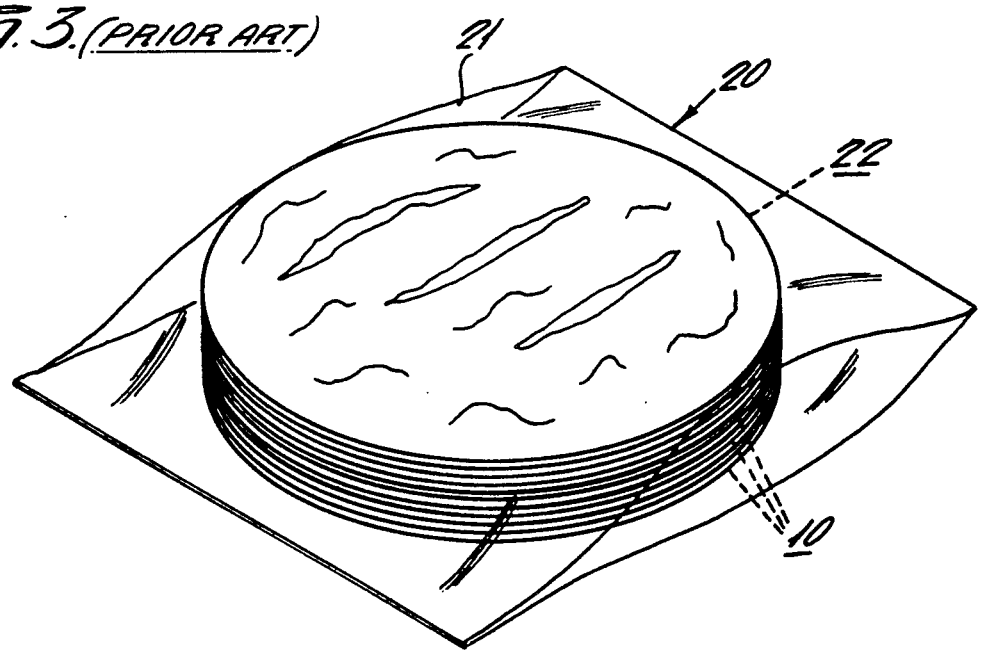
FIG. 3 is a perspective view of a package having therein a stack of tortillas.
Figure 4:
FIG. 4 is a side elevation of adjacent tortillas in a stack.
Figure 5:
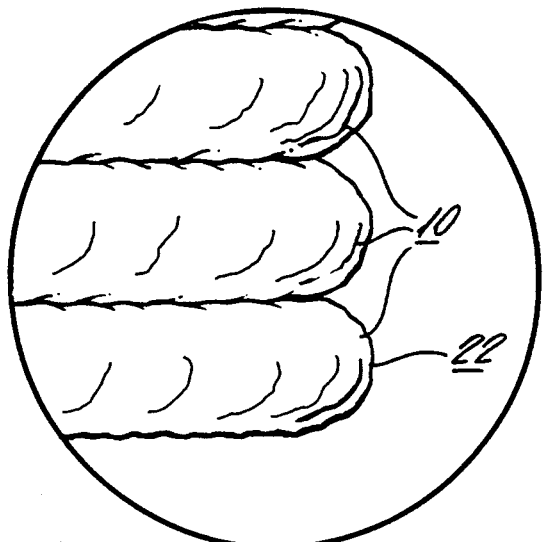
FIG. 5 is a blown-up section of the area designated FIG. 5 in FIG. 4.

As seen in FIG. 3, again in the prior art, a package 20 formed of a suitable moisture-resistant film such as polyethylene, having a suitable closure 21, contains a stack 22 of tortillas 10, for instance twelve high. The tortillas may range up to 14" in diameter, but more generally are about 10½" in diameter. The tortillas are often formed into stacks 22 of one dozen each for packaging. Such stacking can be by hand or by machine. Using continuous machines, up to 10,000 and more tortillas can be produced per hour and packaged per hour.

Commercial, high speed production of such tortillas is well known and for purposes of this invention no such description will be made.

After emerging from the baking area, the tortilla is generally at a temperature of about 180° F. and is then often rapidly cooled down, at room temperature or below for stacking and packaging.

Moisture content in a commercially produced tortilla prior to packaging can range from 27% to 34%.

Present Invention

Figure 2:
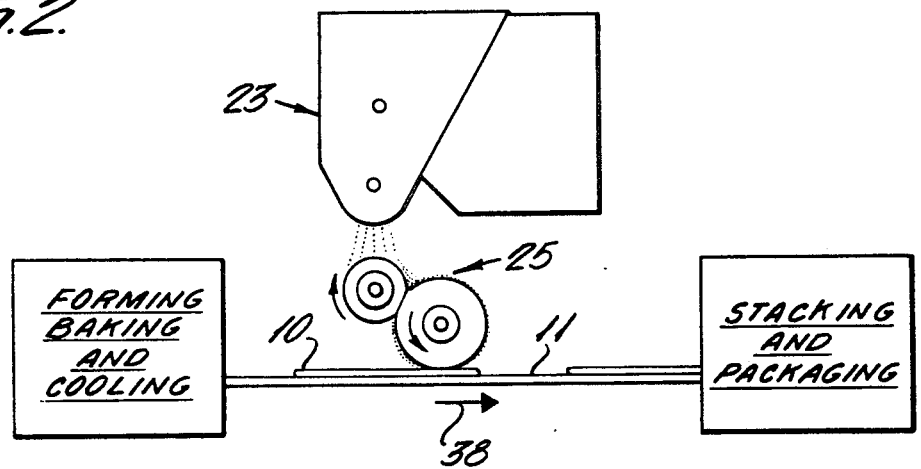
FIG. 2 is a schematic view similar to FIG. 1, showing the apparatus and process of the invention.

The process of the invention occurs, as seen in FIG. 2 after baking and cobling, and before stacking and packaging while the tortilla 10 travels on conveyor 11. The apparatus for practicing the invention comprises generally, as seen in FIG. 2, a hopper and sifter assembly 23, and a roller assembly 25.

The Treated Tortilla

The tortilla of the invention has on its distinct surface layer 12 a relatively uniform distribution of discrete separate particles of a fine powder 26. This distribution of particles is designated 18 in the drawings, and is shown symbolically in FIG. 6, with the understanding such distribution is virtually invisible to the naked eye, and incapable of being actually shown in the drawings. The powder 26 can be a starch such as corn starch, flour such as wheat flour, or a mixture of both or of other dry, edible, fine powder such as tapioca starch.

The weight of the relatively uniformly distributed, discrete, separate particles of powder 26, as depicted at 18 on the surface layer of the tortilla is within a desirable range of from 0.02% to 0.05% of the weight of the tortilla, but permissibly from 0.01% to 0.06% of the weight of the tortilla, and beyond, for instance, up to 0.50% by weight of the tortilla.

It is necessary that the particles be relatively separate from one another, and with virtually no clumps or clots. The particles of powder 26 are so distributed and spread out that they are virtually invisible to the naked eye and not structurally supported from one another as in a clump, but virtually each particle is supported directly from the tortilla surface.

The tortilla 10 of the invention with the particles of powder as described above thereon, as seen in FIGS. 13 through 16, appears virtually identical to the untreated tortilla 10 in the prior art. As seen by a comparison of FIGS. 13 and 14 to the prior art FIGS. 9 and 10, the distinct surface layer 12 is not visibly altered by the invention. Carefully observing an actual tortilla 10 with the invention, however, will reveal an occasional white pinpoint of perhaps a few closely deposited particles, and the surface may appear more dull than the untreated tortilla surface. In feeling a treated tortilla, the surface is more slippery than the surface of an untreated tortilla.

An apparent effect of the film is seen by comparing FIG. 11 to FIG. 15.

Figure 11:
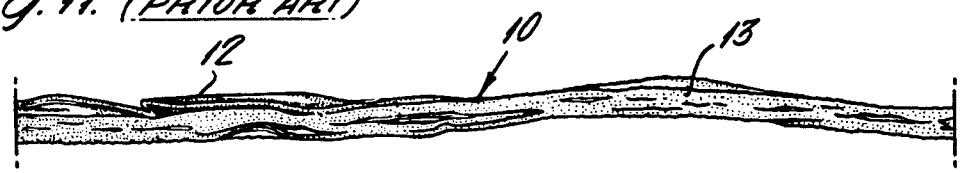
FIG. 11 (prior art) is an enlarged fragmentary sectional elevational view shown on the line 11,11 of FIG.9, illustrating details such as delamination of layers in a slightly dried conventional tortilla.

In FIG. 11, an untreated tortilla, after a slight period of exposure to air, results in a somewhat flaky, delaminated structure wherein the moisture trapped within the tortilla during baking has migrated to and evaporated from the surface. In FIG. 15, a treated tortilla 10 with its relatively uniform distribution 18 of particles of powder 26 thereon, after a period of exposure to air for the same period as the tortilla of FIG. 11, apparently has its moisture still retained within, apparently from the effect of the particles.

Figure 12:
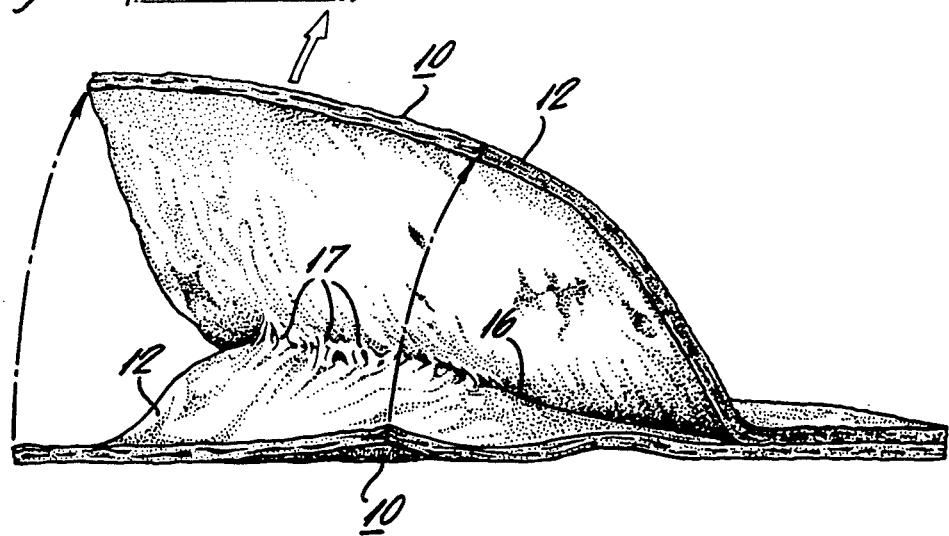
FIG. 12 (prior art) is an enlarged fragmentary pictorial view illustrating the adhesion and scabbing or scaling and peeling that occurs when separating a tortilla from a stack of packaged untreated tortillas.

The effects of the invention on a stack of tortillas is best seen by comparing FIG. 12 showing prior untreated stacked tortillas 10 and FIG. 16 showing stacked tortillas 10 with the invention. The untreated tortillas in FIG. 12 stick and bond together, whereas those of FIG. 16 with the treated tortillas readily separate. In FIG. 12, skin 12 at the top of a lower tortilla bonds to the bottom of an upper tortilla. When the tortillas are separated, they stick at the separation line 16, causing the surface layer 12 to peel at 17, or vice-versa.

In FIG. 16, the treated tortillas 10 separate clean with virtually no sticking or bonding. The result is a tortilla virtually unchanged from what it was before stacking and packaging.

The Apparatus

Figure 6:
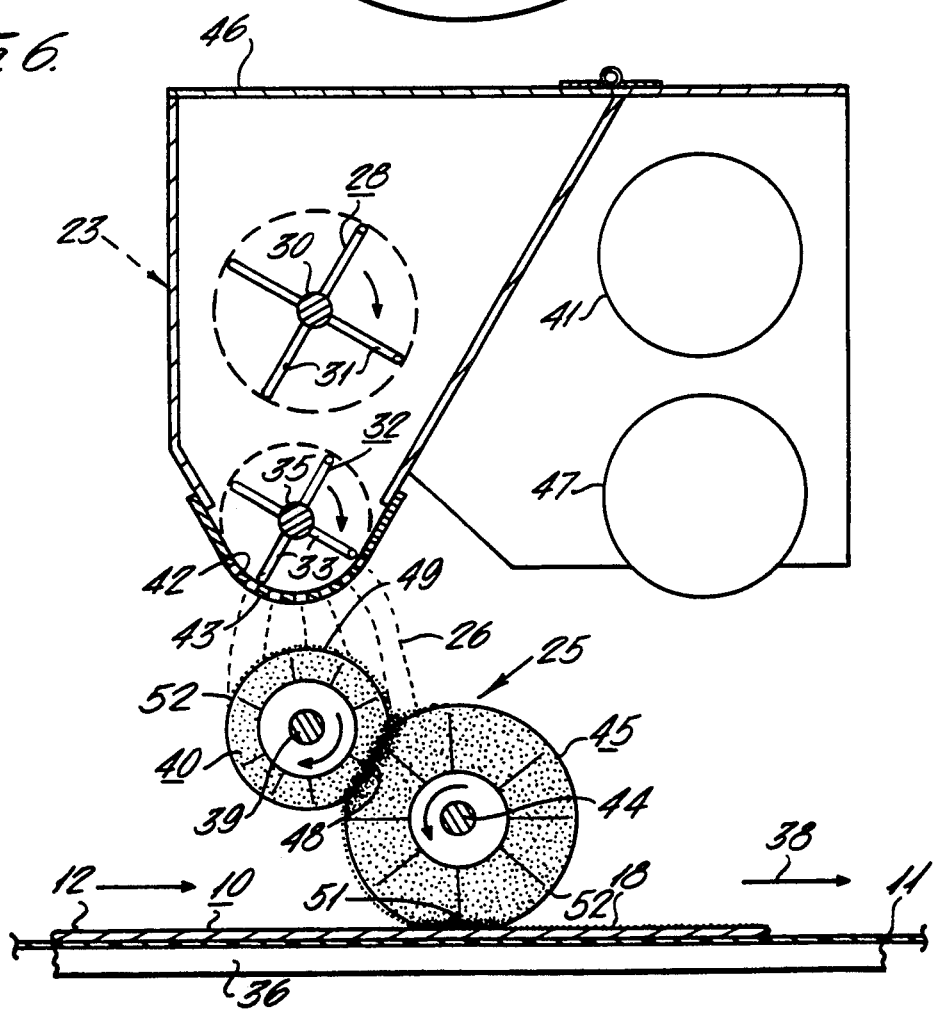
FIG. 6 is a side elevational schematic view of apparatus used to separate powder into discrete particles, uniformly distribute such particles, reservoir such separated and uniformly distributed particles, and deposit such separate, discrete, uniformly distributed particles on a tortilla in accordance with the invention.

The discrete, separate particles, relatively uniformly distributed, are applied by the apparatus as best seen in FIG. 6. Powder 26 in hopper and sift assembly 23 is churned by an agitator 28 which moves very slowly, having a shaft 30 and blades 31. A lower agitator 32 having blades 33 on a shaft 35 passes over the screen 43 which, for instance, can have holes which range in diameter from 1/32" to 1/16" and which occupy from 50% to 75% of the screen.

Figure 7:
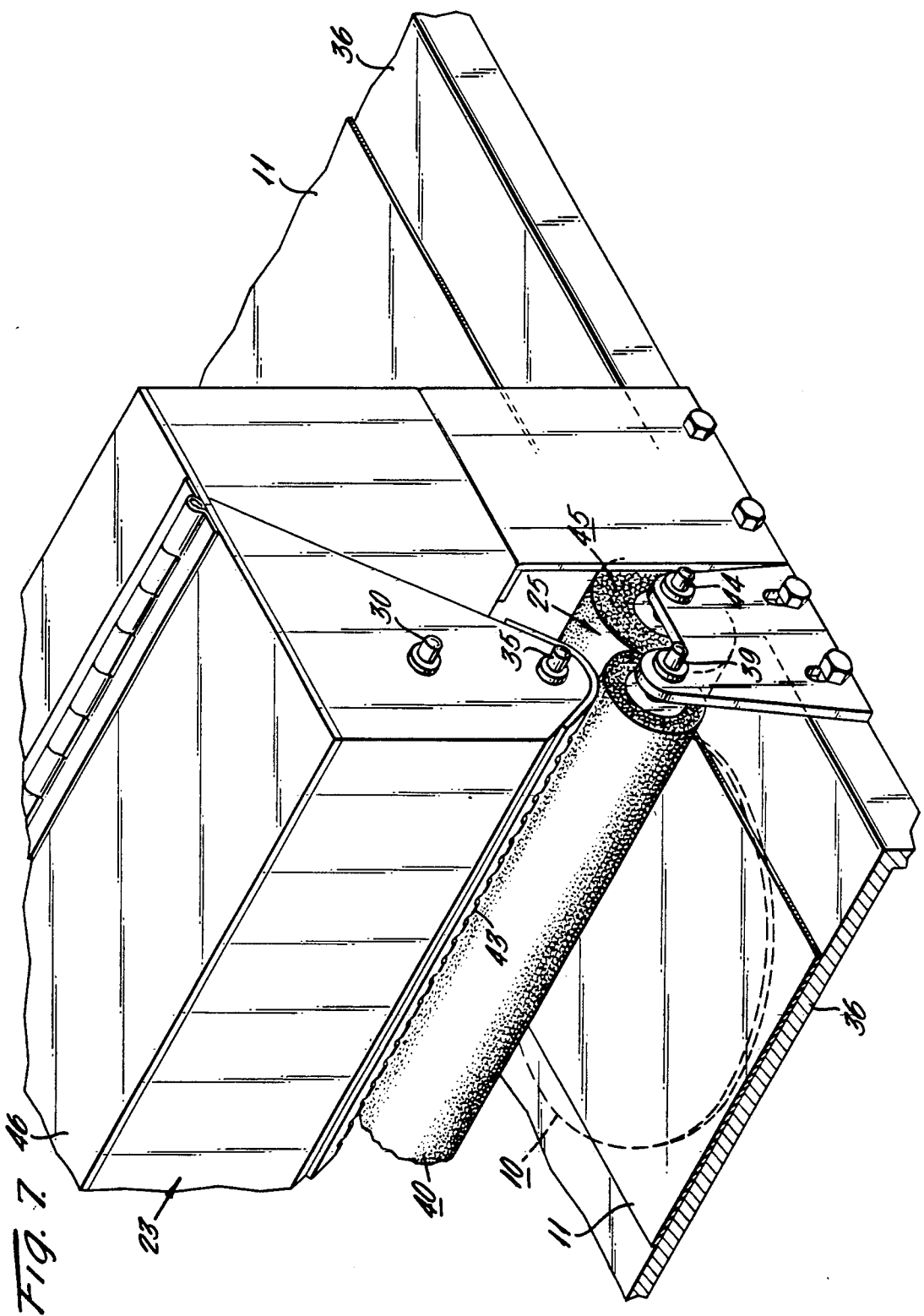
FIG. 7 is a perspective view of the apparatus shown in FIG. 6, along with a portion of a conveyor line and a tortilla represented in phantom lines.
Figure 8:
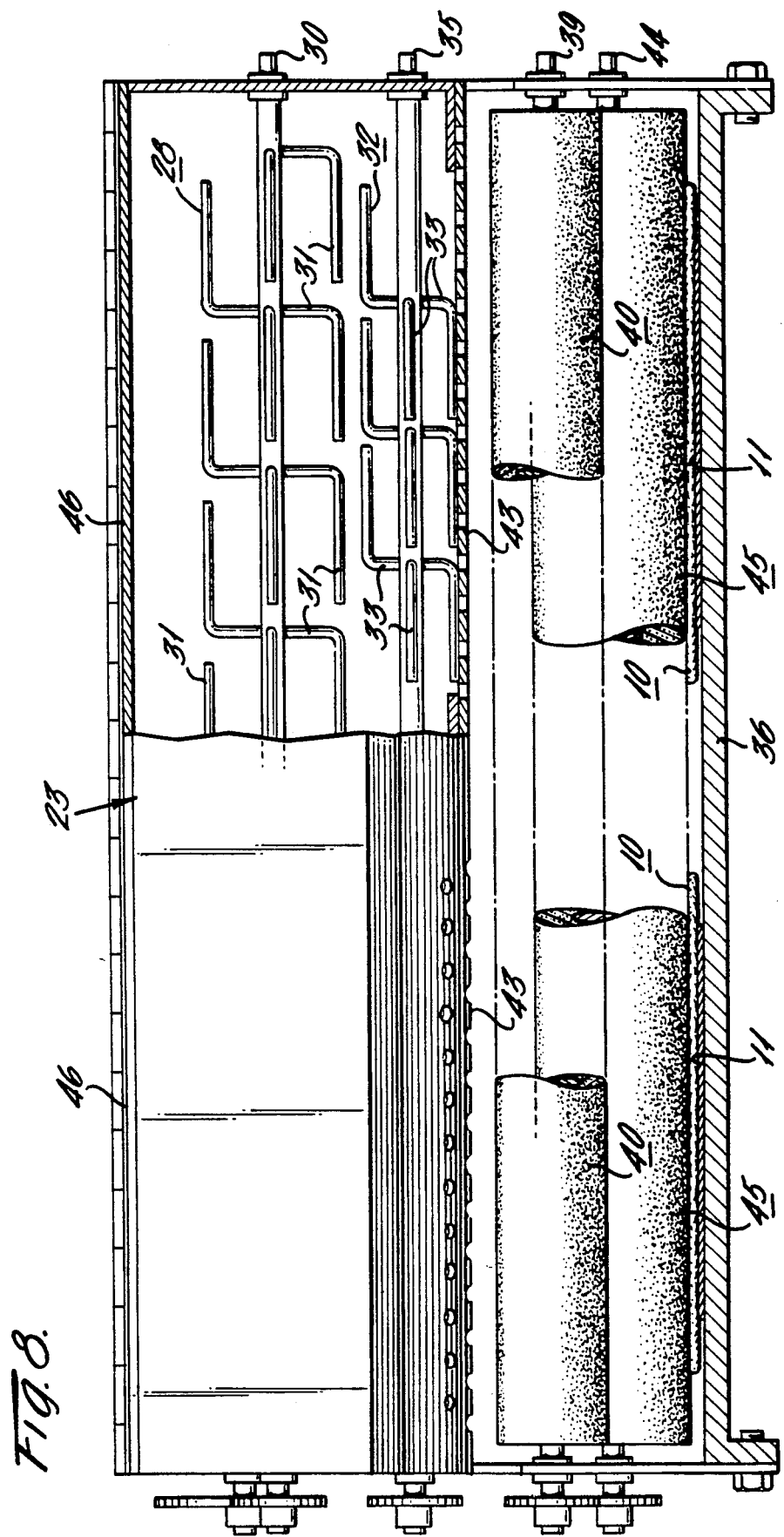
FIG. 8 is a vertical section of the hopper and sifter and a fragmentary vertical section of the rolls of the apparatus of the invention.

The hopper and sifter assembly 23 extends over a table 36 having an endless traveling belt or conveyor 11, moving in a direction as seen by arrow 38. The hopper and sifter assembly 23 as best seen in FIGS. 6 and 7, is triangular in cross section as seen from the side, with the sides sloping inwardly toward screen 43. Screen 43 likewise extends across the table 36 which can be for instance 30" in width. The screen 43 in cross section defines an arc of about 120°. The hopper opening at 42 is about 2" wide.

A motor 41 drives hopper and sifter assembly 23, through sifter shafts 30 and 35, through a drive chain or the like. The motor has a variable speed control. A suitable gear reduction unit reduces the motor speed wherein the shafts 30 and 35 can be turned at a very slow speed, for instance, from 2 to 15 rpms. A lid 46 permits the hopper to be filled.

The sifter screen 43 is blocked in areas where no powder 26 is desired to fall. As will be seen, there are areas below which the tortillas 10 do not pass.

The sifter screen 43 extends directly over a loading roller 40 mounted on a shaft 39. Loading roller 40 as well as deposition roller 45 are desirably of a foam plastic composition.

An example of a suitable material for rollers 40 and 45 would be a polyester-polyurethane, non-reticulated foam of an open cell, lightweight type. Such foam is desirably very soft with a density of, for instance, 1½ lbs. per cubic foot. The foam is desirably of a very fine porosity, for instance, a porosity of about 40 to 80, preferably 60 pores per lineal inch. The foam has an extremely high void volume, for instance about 90 to 98, preferably 97%.

The foam is of a three-dimensional structure and apparently holds the separated particles of powder on its surface as well as within the skeletal structure, in its capacity as a reservoir.

The sponge foam rolls can be sliced 52 circumferentially, radially inward, to make the foam still more soft without detracting from its reservoiring or depositing capabilities.

The loading roller 40 is in slight compression contact with deposition roller 45 mounted on shaft 44. Roller 45 is of the same composition as roller 40, but of a slightly larger diameter, for instance 3". Roller 45 also extends across table 36 for a distance of, for instance, 36". Roller shafts 39 and 44 are so journalled as to provide for a slight compression between the surfaces of rollers 40 and 45, for instance ¼", whereby the center distance between the shafts is about 2½".

Deposition roller 45 is journalled above table 36 and conveyor 11 so that the deposition roller 45 slightly touches the tortilla 10 which travels on the conveyor 11 below roller 45 whereby the roller surface is compressed about 1/16".

A motor 47 drives rollers 40 and 45 through suitable drive connections. Roller 40 travels in a clockwise direction as seen in FIGS. 2 and 6, and roller 45 travels in counterclockwise direction. Both rollers 40 and 45 travel at the same rotation speed, for instance from 160 to 220 rpms.

Since the rollers are of a different diameter, the surface of roller 45 will travel at a greater lineal speed than will that of the surface of roller 40, resulting in a scuffing or grazing action between the rollers, as well as a compression effect between the surfaces at the contact area 48.

It may be desirable to have the loading roller 40 and deposition roller 45 of the same diameter but still in slight compression. In such event, there will be no linear speed differential at the rollers' surfaces.

The speed of conveyor 11 and the surface speed of deposition roller 45 are synchronized so that as tortilla 10 passes below roller 45, there is no relative motion between the surfaces, but rather a pure rolling action with a slight compression of roller 45.

The Process

In operation, tortillas are baked and cooled in the usual prior art manner and then deposited on conveyor 11 which is moving forward on table 36.

Powder 26, for instance extremely fine starch, is deposited in hopper and sifter assembly 23 and sifter shafts 30 and 35 engage from motor 41. Blades 31 on agitator 28 keep dry powder 26 generally loose to pass over agitator 32 which in well known sifter fashion, causes blades 33 to pass the powder through screen 43. Powder 26 falls from screen 43, partially or wholly in clump form where groups of particles of powder 26 adhere together through surface tension or otherwise, as is well known, and fall at 49 onto loading roller 40. This powder in partially or wholly clump form is carried on the surface of roller 40 into compression area 50 wherein the surface of roller 45 is traveling slightly faster than the surface of roller 40, when the rolls are of different size. The surface of roller 45 scuffs or grazes the surface of roller 40 wherein the powder 26 is spread into separate, discrete particles with the clumps and concentrations of powder 26 being eliminated. These separate particles are loaded onto the reservoir and deposition roller 45 by the slight compression between the roller 40 and 45 at area 50. The separate particles are held in the numerous fine, open pores of the roller which acts as a reservoir. The pores of the rollers 40 and 45 act to break down any clumps of powder 26 by a chopping, compartmentizing and reservoiring action.

Some of the uniformly distributed, discrete, separated particles may fall from between the rollers onto the tortilla before it passes beneath the deposition roller 45.

The particles are then carried on the surface of roller 45 to be deposited by slight contact and compression at 51 onto the upper surface of tortilla 10, to form the relatively uniform distribution of separate, discrete particles of powder of the invention on the upper surface of tortilla 10.

The upper surface of tortilla 10 which when of for instance wheat flour, is of a very slight golden color, almost white. The particles of, for instance, starch powder which is white, when deposited on the tortilla surface as explained above are such that they are virtually invisible to the casual observer and only very slightly visible upon inspection. The particles are not detectable to the taste and do not alter the desirability of the product to the customer.

The tortilla 10 with the particles of powder coated thereon then passes onto the stacking and packaging phase of the operation.

The package is then stored at a room, a cooling, a refrigerating, or a freezing temperature until used. As is known of course, the cooler the temperature, the longer the tortilla may be stored and remain in an edible state.

When the package is opened, and when frozen, thawed, the tortillas can be easily separated from one another without sticking or bonding. The tortilla skins are in virtually the same condition as after baking and cooling, and not impaired or damaged in any way. Visually, the tortilla appears the same to the eye as after baking and cooling. Equally important, if not most important, the tortilla taste remains virtually the same as after baking and cooling, with virtually no alteration in taste from the means, process or apparatus of the invention.

We claim:

1. Apparatus for depositing substantially uniformly distributed, discrete, separated particles of dry edible powder on the surface of a tortilla to prevent sticking of tortillas in a packaged stack thereof, comprising
    a) means for storing, sifting and discharging dry, edible powder partially or wholly in clump form onto at least one of a pair of rollers acting to form said powder into separate discrete particles, said rollers including;
    b) a rotating loading roller composed of porous, non-reticulated, open cell resilient foam; and
    c) a second rotating deposition roller also composed of porous, non-reticulated, open cell foam in compressive contact with said loading roller, wherein said deposition roller receives powder from said loading roller into the pores of said deposition roller in which said powder is reservoired in separated, discrete particles; and
    d) conveyor means for carrying tortillas in compressive rolling contact with said deposition roller;
    whereby said dry edible powder is uniformly distributed in separate, discrete particles from the pores of said deposition roller in which it is reservoired onto the surface of said tortillas.

2. The apparatus of claim 1 wherein said rollers are composed of polyester-polyurethane foam.

3. The apparatus of claim 1 wherein the foam has a density of from 1 to 2 pounds per cubic foot.

4. The apparatus of claim 1 wherein the foam has a porosity of between 40 and 80 pores per lineal inch.

5. The apparatus of claim 1 wherein the rollers are composed of a foam which has a void volume of between 90% and 98%.

6. The apparatus of claim 1 wherein at least one roller is slit circumferentially inwardly.

7. The apparatus of claim 1 wherein the loading roller and deposition roller are driven at the same speed and have different diameters whereby the loading roller surface rotates at a different linear speed from the deposition roller surface linear speed, causing scuffing or grazing action between said rollers.

8. The apparatus of claim 1 wherein said means for storing, sifting and discharging dry, edible powder includes a hopper and sifter assembly positioned above the deposition roller for dropping powder onto at least one of the loading and deposition rollers.

9. The apparatus of claim 8 wherein the hopper and sifter assembly has agitators therein which can be speed controlled to control the amount of powder being dropped.

10. Apparatus for depositing substantially uniformly distributed, discrete, separated particles of dry edible powder on the surface of a tortilla to prevent sticking of tortillas in a stack thereof, comprising:
    a) a hopper and sifter assembly including screen discharge means;
    b) at least one agitator means in said hopper rotating adjacent said screen discharge means to provide sifting action to said powder;
    c) a rotating loading roller composed of porous, non-reticulated, open cell, resilient foam positioned below the screen discharge means of said hopper;
    d) a rotating, deposition roller also composed of porous, non-reticulated, open cell, resilient foam and also positioned below the screen discharge means of said hopper and in compressive contact with said loading roller, wherein at least one of said loading and deposition rollers receives said powder from said discharge means; and
    e) conveyor means positioned for carrying tortillas in compressive rolling contact with said deposition roller.

11. The apparatus of claim 10 wherein the hopper contains upper and lower agitator means.

12. The apparatus of claim 10 wherein said screen discharge means has holes from about 1/32" to about 1/16" in diameter making up about 50 to about 75% of the discharge area of said screen discharge means.

13. The apparatus of claim 10 wherein the loading and deposition rollers are composed of polyester foam having about 40–80 pores to the lineal inch and a void volume of about 90–98%.

14. The apparatus of claim 13 wherein the foam has about 60 pores per lineal inch and a void volume of about 97%.

15. The apparatus of claim 10 wherein the loading and deposition rollers driven at the same speed differ in diameter whereby the surfaces thereof rotate at different linear speeds to provide a scuffing action therebetween.

16. The apparatus of claim 10 wherein an agitator is speed controlled.

* * * * *